(12) United States Patent
Tsen et al.

(10) Patent No.: US 11,836,314 B1
(45) Date of Patent: Dec. 5, 2023

(54) SENSITIVITY ADJUSTMENT FOR A TOUCHPAD OF AN INFORMATION HANDLING SYSTEM

(71) Applicant: Dell Products L.P., Round Rock, TX (US)

(72) Inventors: Chiu-Jung Tsen, Zhubei (TW); Hsu Feng Lee, Taipei (TW); Jace W. Files, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/045,961

(22) Filed: Oct. 12, 2022

(51) Int. Cl.
*G06F 3/041* (2006.01)
*G06F 3/02* (2006.01)

(52) U.S. Cl.
CPC .......... *G06F 3/0416* (2013.01); *G06F 3/0213* (2013.01)

(58) Field of Classification Search
CPC ........................ G06F 3/04166; G06F 3/041661
See application file for complete search history.

(56) References Cited

U.S. PATENT DOCUMENTS

| | | | |
|---|---|---|---|
| 2019/0155451 A1* | 5/2019 | Yeh | G06F 3/0443 |
| 2021/0357053 A1* | 11/2021 | Li | G06F 3/0412 |
| 2022/0197476 A1* | 6/2022 | Ho | G06F 3/04812 |

* cited by examiner

*Primary Examiner* — Priyank J Shah
(74) *Attorney, Agent, or Firm* — Norton Rose Fulbright US LLP

(57) ABSTRACT

An apparatus includes a memory and one or more processors coupled to the memory. The one or more processors are configured to determine a plurality of input areas of a touchpad associated with a computing device. The touchpad is associated with a sensitivity setting that indicates a first sensitivity for a first input area of the touchpad and that further indicates a second sensitivity for a second input area of the touchpad that is different than the first input area. The one or more processors are further configured to receive user input from a user input device associated with the computing device. The one or more processors are further configured to change the sensitivity setting based on the user input. Changing the sensitivity setting includes reducing the first sensitivity.

20 Claims, 7 Drawing Sheets

SENSITIVITY ADJUSTMENT FOR A TOUCHPAD OF AN INFORMATION HANDLING SYSTEM

FIELD OF THE DISCLOSURE

The instant disclosure relates to electronic devices, such as information handling systems. More specifically, portions of this disclosure relate to sensitivity adjustment of a touchpad of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some circumstances, the variety of hardware and software components may introduce issues that detract from user experience. To illustrate, an information handling system (such as a laptop computer) may include multiple input devices, such as a keyboard and a touchpad. In some circumstances, the multiple input devices may be in close proximity to one another, which may result in unintended operations. For example, while typing at the keyboard, a user may inadvertently provide input to the touchpad (which may be referred to as a "ghost touch"). Such inadvertent input may result in unintended operations, such as prematurely sending an email or unintentionally closing or opening a program or file. As a result, user experience may be diminished while also potentially increasing usage of processing resources associated with the information handling system, such as by unintentionally causing information handling system to retrieve a program from a main memory, to load the program or file to a random access memory, and to begin executing the program using a processor of the information handling system.

SUMMARY

In some aspects of the disclosure, an information handling system may segment a touchpad into multiple different areas and may assign different respective sensitivities to the multiple areas. For example, the information handling system may decrease the sensitivity associated with one or more unused (or inactive) areas of the touchpad. In some examples, the information handling system may decrease the sensitivity of one or more areas of the touchpad independently of one or more other areas of the touchpad. For example, the information handling system may decrease the sensitivity of one or more areas of the touchpad while increasing or maintaining the sensitivity of one or more other areas of the touchpad.

In some implementations, the information handling system may initiate changing of the sensitivities of the touchpad based on detecting input to a keyboard of the information handling system. To illustrate, in some implementations, the information handling system may correspond to a laptop computer, and the touchpad may correspond to a "full palmrest" touchpad that extends edge-to-edge with, and that has a common width as, the keyboard. In some such implementations, a user may be relatively likely to inadvertently touch outer portions of the touchpad when typing at the keyboard. To reduce or avoid unintended operation resulting from such inadvertent touching, the information handling system may reduce sensitivities associated with the outer portions of the touchpad. As a non-limiting example, the information handling system may reduce sensitivities of the outer portions of the touchpad while maintaining or increasing the sensitivity of an inner portion of the touchpad, which the user may be less likely to inadvertently touch. In some implementations, reducing a sensitivity associated with an area of the touchpad may include reducing a scan frequency (also referred to herein as a scan rate) of the area.

One or more aspects described herein may enhance operation of an information handling system. For example, by decreasing the sensitivity of an inactive area of a touchpad, unintended operation that may result from a "ghost touch" of the inactive area may be reduced or avoided. By reducing or avoiding such unintended operations, user experience may be enhanced while also potentially reducing unintended usage of processing resources associated with the information handling system, such as by avoiding unintentionally causing the information handling system to retrieve a program from a main memory, to load the program or file to a random access memory, and to begin executing the program using a processor the information handling system. Accordingly, user experience and device performance may be enhanced.

In some aspects, an apparatus includes a memory and one or more processors coupled to the memory. The one or more processors are configured to determine a plurality of input areas of a touchpad associated with a computing device. The touchpad is associated with a sensitivity setting that indicates a first sensitivity for a first input area of the touchpad and that further indicates a second sensitivity for a second input area of the touchpad that is different than the first input area. The one or more processors are further configured to receive user input from a user input device associated with the computing device. The one or more processors are further configured to change the sensitivity setting based on the user input. Changing the sensitivity setting includes reducing the first sensitivity.

In some other aspects, a method includes determining a plurality of input areas of a touchpad associated with a computing device. The touchpad is associated with a sensitivity setting that indicates a first sensitivity for a first input area of the touchpad and that further indicates a second sensitivity for a second input area of the touchpad that is different than the first input area. The method further includes receiving user input from a user input device associated with the computing device. The method further includes changing the sensitivity setting based on the user input. Changing the sensitivity setting includes reducing the first sensitivity.

In some other aspects, an information handling system includes a touchpad, a keyboard, a memory, and one or more processors coupled to the memory. The one or more processors are configured to determine a plurality of input areas of the touchpad. The touchpad is associated with a sensitivity setting that indicates a first sensitivity for a first input area of the touchpad and that further indicates a second sensitivity for a second input area of the touchpad that is different than the first input area. The one or more processors are configured to receive user input from a user input device associated with the computing device. The user input device includes one of the touchpad or the keyboard. The one or more processors are configured to change the sensitivity setting based on the user input. Changing the sensitivity setting includes reducing the first sensitivity.

Some examples herein may be implemented using an information handling system. For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
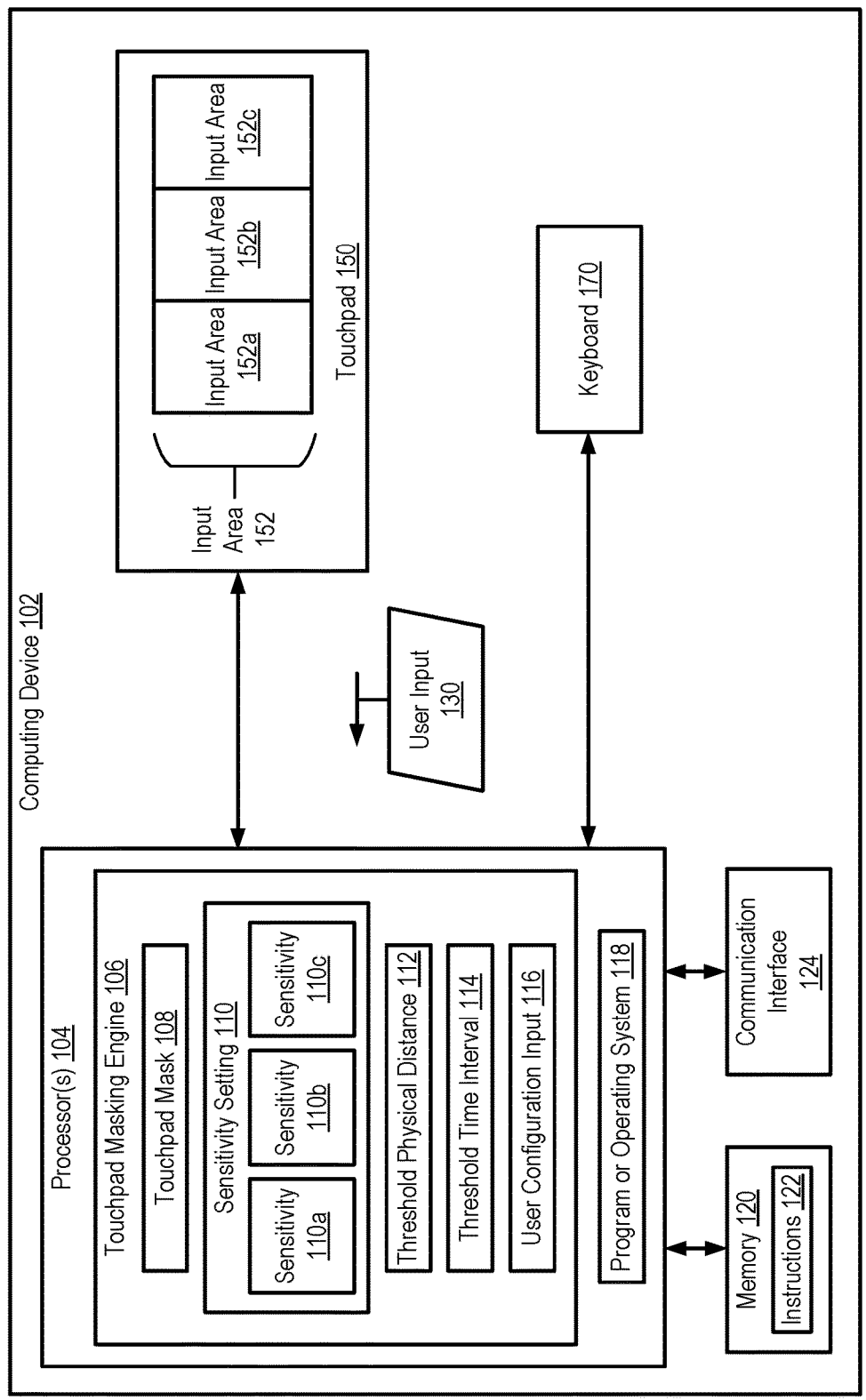
FIG. 1 is a block diagram illustrating an example of a system that includes a computing device according to some aspects of the disclosure.

FIG. 1 is a block diagram illustrating an example of a system 100 that includes a computing device 102 according to some aspects of the disclosure. In some examples, the computing device 102 may include or correspond to a laptop computer. In some other examples, the computing device 102 may include or correspond to another computing device, such as a desktop computer, a tablet computer, or a portable device (such as a mobile device, a personal digital assistant (PDA), or a portable media player), as illustrative examples.

The computing device 102 may include one or more processors 104, a memory 120 coupled to the one or more processors 104, and a communication interface 124 coupled to the one or more processors 104. In some implementations, the memory 120 may store instructions 122 executable by the one or more processors 104 to initiate, perform, or control one or more operations described herein.

The computing device 102 may further include or may be in communication with a touchpad 150. In some examples, the touchpad 150 may include or may be referred to as a trackpad, a touch panel, or a touchscreen. The touchpad 150 may include an input area 152 that is configured to receive user input, such as via one or more of a user fingertip or a stylus. The touchpad 150 may provide the user input or a representation of the user input to the one or more processors 104. In some implementations, the input area 152 may include a transducer device. In some examples, the transducer device may include capacitive sensors that detect a change of capacitance in the capacitive sensors in response to the user input. Alternatively or in addition, the transducer device may include one or more other types of devices, such as resistive sensors, as an illustrative example.

The input area 152 may include multiple input areas (also referred to as segments, partitions, subsets, or portions of the input area 152). For example, the input area 152 may include a input area 152*a*, a input area 152*b* different than the input area 152*a*, and a input area 152*c* different than the input area 152*a* and the input area 152*b*. The input area 152*b* may be adjacent to and may be positioned between the input area 152*a* and the input area 152*c*. For example, the input area 152*b* may correspond to a middle portion of the input area 152*b*. Accordingly, the example of FIG. 1 illustrates that the input area 152 may be segmented or partitioned into three different regions. In other examples, the input area 152 may be segmented or partitioned into a different number of regions, such as two regions, four regions, five regions, or another number of regions.

The computing device 102 may further include or may be in communication with a keyboard 170. For example, the keyboard 170 may be configured to receive user input (e.g., via keys of the keyboard 170) and to transmit the user input or a representation of the user input to the one or more processors 104 via a wired or wireless connection.

In some examples, one or both of the touchpad 150 or the keyboard 170 may be integrated within the computing device 102. For example, the computing device 102 may correspond to a computer (e.g., a laptop computer) in which the one or both of the touchpad 150 or the keyboard 170 are integrated. In some such examples, one or both of the touchpad 150 or the keyboard 170 may communicate with the one or more processors 104 via one or more wired connections, such as a bus. The communication interface 124 may include the one or more wired connections. In some other examples, one or both of the one or both of the touchpad 150 or the keyboard 170 may wirelessly communicate with the one or more processors 104 (e.g., via a wireless communication interface of the communication interface 124).

During operation, the one or more processors 104 may execute a touchpad masking engine 106. The touchpad masking engine 106 may be associated with a touchpad mask 108. The touchpad mask 108 may specify or may be associated with a sensitivity setting 110 of the touchpad 150. In some examples, the sensitivity setting 110 may indicate a respective sensitivity associated with each region of the input area 152. For example, the sensitivity setting 110 may indicate a sensitivity 110*a* associated with the input area 152*a*, a sensitivity 110*b* associated with the input area 152*b*, and a sensitivity 110*c* associated with the input area 152*c*.

The one or more processors 104 may receive user input 130 from a user input device associated with the computing device 102. In some examples, the user input device may include or correspond to the touchpad 150 or a portion of the touchpad 150, such as the input area 152*b*, and the one or more processors 104 may receive the user input 130 from the touchpad 150. In such examples, a user may interact with the input area 152 (or a portion of the input area 152) to generate the user input 130, such as by touching, tapping, swiping, scrolling, drawing, or writing on the input area 152. In some other examples, the user input device may include or correspond to the keyboard 170, and the one or more processors 104 may receive the user input 130 from one or more keys the keyboard 170. For example, a user may press one or more keys of the keyboard 170 to generate the user input 130.

The one or more processors 104 may provide the user input 130 to the touchpad masking engine 106. The touchpad masking engine 106 may perform one or more operations based on the user input 130. For example, the touchpad masking engine 106 may change the sensitivity setting 110 based on the user input 130 using the touchpad mask 108.

In some examples, the touchpad mask 108 indicates to reduce one or more sensitivities of the sensitivity setting 110. For example, the touchpad mask 108 may indicate to reduce the sensitivity 110*a* and the sensitivity 110*c*. As referred to herein, reducing a sensitivity of an input area (such as the sensitivity 110*a* and the sensitivity 110*c*) may include reducing the sensitivity to a value greater than zero, reducing the sensitivity to zero, reducing a scan rate (also referred to herein as a scan frequency) of the input area, or disabling the input area. Further, reducing a sensitivity of an input area may also be referred to as masking the input area. To further illustrate, decreasing the sensitivity of an input area (or masking the input area) may include reducing a scan frequency associated with the input area from a first scan frequency to a second scan frequency that is less than the first scan frequency. In some examples, the first scan frequency may indicate a first number of times per second the input area is scanned, and the second scan frequency may indicate a second number of times per second the input area is scanned, where the first number is a positive integer greater than zero, and where the second number is less than the first number and is greater than or equal to zero.

In some aspects, one or more of the sensitivities 110*a-c* may be changed (e.g., reduced) independently of at least one other sensitivity of the sensitivities 110*a-c*. To illustrate, in some examples, one of the sensitivities 110*a-c* may be reduced while maintaining another of the sensitivities 110*a-c*. In some other examples, one or more of the sensitivities 110*a-c* may be reduced while increasing at least one other of the sensitivities 110*a-c*. In such examples, the touchpad mask 108 may indicate to reduce one or more sensitivities of the sensitivity setting 110 and may further indicate to maintain or increase one or more sensitivities of the sensitivity setting 110.

In some examples, the one or more processors 104 may adjust or determine multiple sensitivities of the sensitivity setting 110 concurrently or in parallel. In an illustrative example, based on the user input 130 and the touchpad mask 108, the touchpad masking engine 106 may reduce the sensitivities 110*a* and 110*c* concurrently or in parallel with maintaining or increasing the sensitivity of the 110*b*.

To further illustrate, in some implementations, the computing device 102 may correspond to a laptop computer, and the user input 130 may correspond to typing from a user via the keyboard 170. Because the hands of the user may be positioned near the edges of the touchpad 150 (such as in implementations in which the touchpad 150 has a same or similar width as the keyboard 170), the touchpad masking engine 106 may mask the input area 152*a* and the input area 152*c* (e.g., by reducing the sensitivity 110*a* and the sensitivity 110*c*) to reduce or avoid unintended operations that may result from unintentional touching of the input area 152*a* and the input area 152*c* while a user types via the keyboard 170.

Alternatively or in addition, the user input 130 may correspond to interaction with the touchpad 150. For example, a user may touch, tap, swipe, scroll, draw, or write on the input area 152*b* to generate the user input 130. In some examples, the user input 130 may exclude input from one or both of the input areas 152*a* and 152*c*. In such examples, the touchpad masking engine 106 may mask the input area 152*a* and the input area 152*c* (e.g., by reducing the sensitivity 110*a* and the sensitivity 110*c*) to reduce or avoid unintended operations that may result from unintentional touching of the input area 152*a* and the input area 152*c* while a user interacts with the input area 152*b*.

In some implementations, the touchpad masking engine 106 may maintain the sensitivity 110*b* based on the user input 130. For example, the touchpad masking engine 106 may maintain the sensitivity 110*b* at a particular value (such as a default or user-specified value) without changing the sensitivity 110*b* in response to the user input 130. In such examples, the touchpad mask 108 may specify that the sensitivity 110*a* and the sensitivity 110*c* are to be reduced based on the user input 130 may further specify that the sensitivity 110*b* is to be maintained based on the user input 130.

In some other implementations, the touchpad masking engine 106 may increase the sensitivity 110*b* based on the user input 130. For example, the touchpad masking engine 106 may increase the sensitivity 110*b* from a particular value (such as a default or user-specified value) to another value that is greater than the particular value. In such examples, the touchpad mask 108 may specify that the sensitivity 110*a* and the sensitivity 110*c* are to be reduced based on the user input 130 may further specify that the sensitivity 110*b* is to be increased based on the user input 130.

In some examples, increasing the sensitivity 110*b* while reducing one or more other sensitivities (such as the sensitivity 110*a* and the sensitivity 110*c*) may enable the computing device 102 to comply with an industry standard, a vendor-specific standard, or another metric. To illustrate, an industry standard or a vendor of a component or software of the computing device 102 may specify that the input area 152 is to have an at least a threshold sensitivity. In such examples, increasing the sensitivity 110*b* while reducing one or more other sensitivities may enable trackpad masking while also complying with the threshold sensitivity (e.g., by enabling an average sensitivity of the input area 152 to comply with the threshold sensitivity).

In some examples, the user input 130 is received from the input area 152*b* of the touchpad 150, and the touchpad masking engine 106 may monitor for second user input to determine whether any of the second user input is within in a portion of the input area 152*b* that is within a threshold physical distance 112 of the input area 152*a* or the input area 152*c*. For example, if the user input 130 is initially received in the input area 152*b*, and if the user input 130 indicates movement of a user fingertip or stylus to the left, the user input 130 may in some cases correspond to a swipe left operation. If any of the user input 130 is in a portion of the input area 152*b* that is within threshold physical distance 112 of the input area 152*a*, the touchpad masking engine 106 may increase the sensitivity 110*a* (e.g., from a reduced value to another particular value, such as a default or user-specified value). In such examples, the touchpad masking engine 106 may "wake" the input area 152*a* in case user input is to be received within the input area 152*a*.

Similarly, if the user input 130 is initially received in the input area 152*b*, and if the user input 130 indicates movement of a user fingertip or stylus to the right, the user input 130 may in some cases correspond to a swipe right operation. If any of the user input 130 is in a portion of the input area 152*b* that is within the threshold physical distance 112 of the input area 152*c*, the touchpad masking engine 106 may increase the sensitivity 110*c* (e.g., from a reduced value to another particular value, such as a default or user-specified value). In such examples, the touchpad masking engine 106 may "wake" the input area 152*c* in case user input is to be received within the input area 152*c*.

The touchpad masking engine 106 may detect expiration of a threshold time interval 114 since performing a change of the sensitivity setting 110 during which no additional user input 130 is received via the user input device. For example, the touchpad masking engine 106 may include or may access a counter (such as a hardware counter or a software counter). The touchpad masking engine 106 may reset the counter based on performing the change of the sensitivity setting 110.

Based on detecting expiration of the threshold time interval 114 since performing the change of the sensitivity setting 110 during which no additional user input 130 is received via the user input device, the touchpad masking engine 106 may adjust the sensitivity setting 110. For example, the touchpad masking engine 106 may increase the sensitivity 110*a* and the sensitivity 110*c* from a temporarily reduced value to a particular value (such as a default or user-specified value). Alternatively or in addition, the touchpad masking engine 106 may decrease the sensitivity 110*b*, such as from a temporarily increased value to another particular value (such as a default or user-specified value).

The touchpad masking engine 106 may dynamically modify one or more parameters associated with the touchpad 150 during operation of the computing device 102. For example, the touchpad masking engine 106 may dynamically modify one or more of a first size of the input area 152*a*, a second size of the input area 152*b*, or a third size of the input area 152*c*. As an illustrative example, the touchpad masking engine 106 may increase (or decrease) a size of the second input are 152*b* and may decrease (or increase) sizes of one or both of the input area 152*a* or the input area 152*c*, such as in response to detecting a threshold number of instances of user input in a portion of the input area 152*b* that is within the threshold physical distance 112 of the input area 152*a* or the input area 152*c*. In such examples, the touchpad masking engine 106 may detect that a user tends to use a larger (or smaller) portion of the input area 152.

Alternatively or in addition, the touchpad masking engine 106 may dynamically modify a quantity of segments of the input area 152. For example, the touchpad masking engine 106 may increase a "resolution" associated with masking of the touchpad 150 by increasing the quantity from three to five (where each of the five input areas may be associated with a respective sensitivity of the sensitivity setting 110). Other examples are also within the scope of the disclosure.

In some implementations, the touchpad masking engine 106 may receive user configuration input 116 indicating configuration of the first size, the second size, or the quantity of segments of the input area 152. For example, a user with larger (or smaller) hands or fingers may wish to change a size of the input area 152*b*. As another example, a user may wish to change the quantity of segments of the input area 152, such as by increasing the quantity from three to five (where each of the five input areas may be associated with a respective sensitivity of the sensitivity setting 110). Other examples are also within the scope of the disclosure.

Alternatively or in addition, the computing device 102 may execute a program or operating system 118 that specifies one or more of the first size, the second size, or a quantity of segments of the input area 152. For example, the program or operating system 118 may specify such parameters in connection with a user profile. Upon a particular user logging into the computing device 102, the program or operating system 118 may access and load the user profile. In some examples, the user profile may specify the sensitivity setting 110. Accordingly, in some implementations, one or more parameters described herein may be user-configurable (e.g., via the user configuration input 116), may be specified by the program or operating system 118, or both.

To further illustrate, in some implementations, the program or operating system 118 may include a video game application. The video game application may specify different a sensitivity setting 110 for different criteria associated with the video game application, such as a different sensitivity setting 110 for one or more of a user of the video game application, a character within the video game application, a level or stage of the video game application, or a vehicle, weapon, or item of the video game application, as illustrative examples. In some examples, one or both of the touchpad 150 or the keyboard 170 may be integrated within or may correspond to a game controller (e.g., a joystick, gamepad, or other game controller) associated with the video game application.

Figure 2:
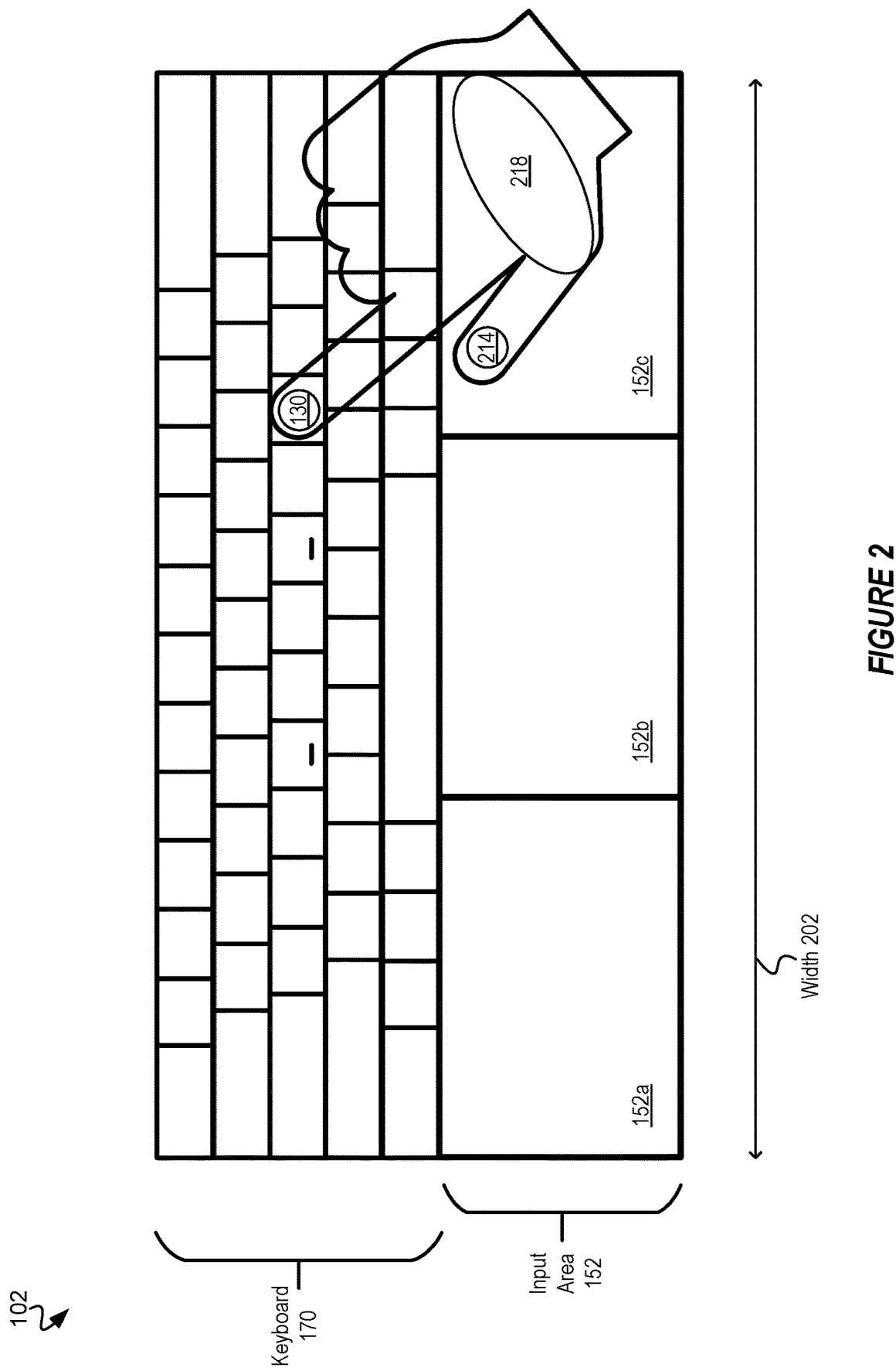
FIG. 2 is a block diagram illustrating an example of at least a portion of the computing device of FIG. 1 according to some aspects of the disclosure.

FIG. 2 is a block diagram illustrating an example of at least a portion of the computing device 102 of FIG. 1 according to some aspects of the disclosure. As illustrated in the example of FIG. 2, the computing device 102 may correspond to a laptop computer or a portion of a laptop computer. FIG. 2 also illustrates that the input area 152 of the touchpad 150 may be segmented into the input areas 152a, 152b, and 152c.

In some implementations, the touchpad 150 has a same width 202 as, and extends edge-to-edge with, one or both of the keyboard 170 or a display device (not shown in FIG. 2) that may be included in the computing device 102. In some examples, the touchpad 150 may be referred to as a full palm-rest touchpad. Further, as referred to herein, the touchpad 150 may have the same width 202 as, and may extend edge-to-edge with, one or both of the keyboard 170 or the display device even if one or more of the touchpad 150, the keyboard 170, or the display device includes a border region, such as the border of a protective or decorative enclosure. To illustrate, in some examples, such a border region may have a width of approximately 0.1 millimeters (mm) to 10 mm. Other examples are also within the scope of the disclosure.

In some examples, the input area 152 of the touchpad 150 may be proximate to the keyboard 170, such as if the input area 152 is adjacent to or in contact with the keyboard 170. As a result, in some cases, user input (such as the user input 130) to the keyboard 170 may result in inadvertent touching of the input area 152, which may cause unintended operation of the computing device 102. To illustrate, in some examples, by providing the user input 130, a user may inadvertently touch the input area 152c, such as via touch input 214. Alternatively or in addition, in some examples, by providing the user input 130 to the keyboard 170, the user may inadvertently touch the input area 152c, such as via palm input 218. Other examples are also within the scope of the disclosure. To reduce or avoid unintended operation that may result from inadvertent touching of the input area 152, the computing device 102 may mask one or more regions of the input area 152, such as one or both of the input areas 152a, 152c, based on the user input 130.

In some examples, the computing device 102 may be configured to distinguish between touch input (such as the touch input 214) and palm input (such as the palm input 218). For example, the computing device 102 may be configured to classify input as either touch input or palm input based on one or more of an area associated with the input (such as a number of capacitive or resistive sensors activated by the input), a duration associated with the input, or an amount of force associated with the input. To illustrate, touch input (e.g., tapping of the input area 152) may be associated with less area, less duration, and less force than palm input (e.g., accidental resting of a palm on the input area 152). In some such examples, the computing device 102 may be configured to classify input as touch input based on one or more of an area associated with the input failing to satisfy (e.g., being less than) an area threshold, a duration associated with the input failing to satisfy a duration threshold, or an amount of force associated with the input failing to satisfy a force threshold. In some other examples, the computing device 102 may be configured to classify input as touch input based on one or more of an area associated with the input satisfying the area threshold, a duration associated with the input satisfying the duration threshold, or an amount of force associated with the input satisfying the force threshold.

In some implementations, one or more operations herein may be performed in a "balanced" mode or based on an "unbalanced" mode. To illustrate, the example of FIG. 2 illustrates that the user input 130 may be received at a right portion (e.g., the right half) of the keyboard 170, such as at the "L" key of the keyboard 170. In an example of the balanced mode, the touchpad masking engine 106 of FIG. 1 may mask both the input area 152a and the input area 152c based on detecting pressing of the "L" key via the user input 130. In an example of the unbalanced mode, the touchpad masking engine 106 of FIG. 1 may mask the input area 152c without masking the input area 152a (e.g., until detecting user input via the left half of the keyboard 170). In some implementations, one or both of the balanced mode or the unbalanced mode may be specified by one or more of the user configuration input 116 or the program or operating system 118.

Further, depending on the implementation, the touchpad masking engine 106 of FIG. 1 may mask the input area 152b based on the user input 130 or may refrain from masking the input area 152b based on the user input 130. To illustrate, in some implementations, the touchpad masking engine 106 may mask the input area 152b (alternatively or in addition to masking one or more of the input area 152a or the input area 152c) if the user input 130 is received in a middle one-third of the keyboard 170, such as via the "G" key or "H" key of the keyboard 170. Such a mode of operation may be referred to as an "inside" masking scheme.

In some other implementations, one or more operations described herein may be performed irrespective of the particular location of the keyboard 170 at which the user input 130 is received. For example, in some implementations, the touchpad masking engine 106 of FIG. 1 may mask the input area 152a and the input area 152c based on the user input 130 without masking the input area 152b based on the user input 130 (irrespective of the particular location of the keyboard 170 at which the user input 130 is received). Such a mode of operation may be referred to as an "outside" masking scheme or as a "palm rejection" masking scheme.

Figure 3:
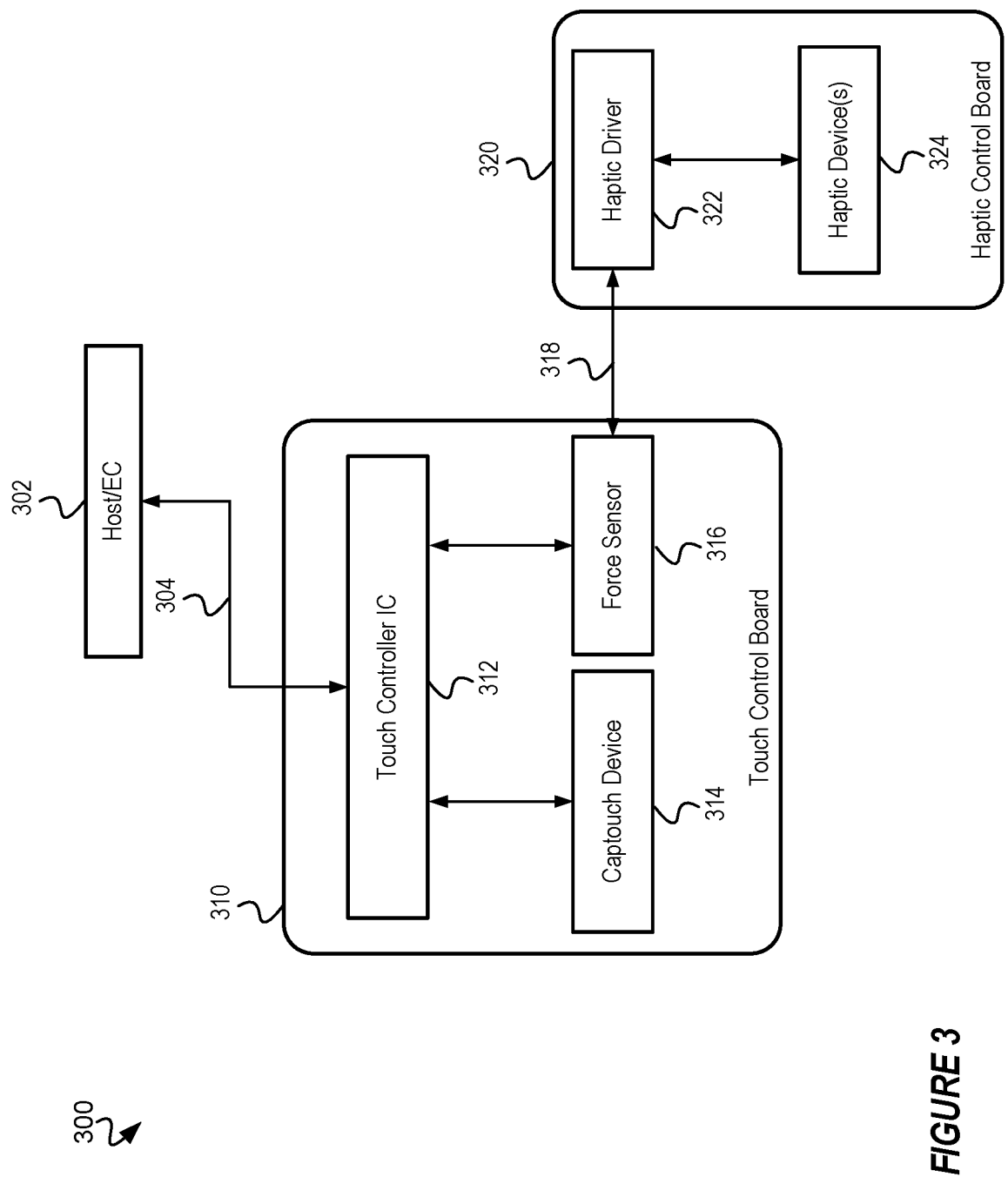
FIG. 3 is a block diagram illustrating another example of a system according to some aspects of the disclosure.

FIG. 3 is a block diagram illustrating another example of a system 300 according to some aspects of the disclosure. In some implementations, the system 300 is included in the computing device 102 of FIGS. 1 and 2.

The system 300 may include one or more of a host device or an embedded controller (host/EC) 302, a touch control board 310, and a haptic control board 320. The host/EC 302 may be coupled to the touch control board 310, such as via a bus 304. The touch control board 310 may be coupled to the haptic control board 320, such as via a bus 318. To illustrate, in a non-limiting example, one or both of the bus 304 or the bus 318 may include an inter-integrated circuit (I2C) bus. Other examples are also within the scope of the disclosure.

The touch control board 310 may include a touch controller integrated circuit (IC) 312. The touch controller IC may execute instructions, such as firmware (F/W). The instructions may include instructions of the touchpad masking engine 106 of FIG. 1. The touch controller IC 312 may be coupled to the host/EC 302 (e.g., via the bus 304). The touch control board 310 may further include a capacitive touch (captouch) device 314 and a force sensor 316. In some examples, the captouch device 314 is coupled to the touch controller IC 312, and the force sensor 316 is coupled to the haptic control board 320 (e.g., via the bus 318). Although some examples may be described with reference to capacitive sensing, other examples are also within the scope of the disclosure (such as resistive sensing, as an illustrative example).

The haptic control board 320 may include a haptic driver IC 322, which may include a microcontroller unit (MCU) that executes instructions, such as F/W. The haptic control board 320 may further include one or more haptic devices 324 (such as piezo devices). The haptic driver IC 322 may be coupled to the force sensor 316 (e.g., via the bus 318) and to the one or more haptic devices 324.

During operation, the touch control board 310 may receive user input, such as the user input 130. The touch control board 310 may detect the user input 130 (e.g., using the captouch device 314) and may perform one or more operations described herein, such as by performing palm rejection masking based on the user input 130.

Further, the touch control board 310 may provide an instruction to the haptic driver IC 322 based on the user input 130. The instruction may indicate to perform one or more haptic operations (such as a haptic feedback operation) using the one or more haptic devices 324). To illustrate, the haptic control board 320 may provide the user a negative haptic feedback response if the user touches one or more masked regions of the input area 152. The negative haptic feedback response may indicate that the one or more regions are disabled.

Alternatively or in addition to the negative haptic feedback response, the touch control board 310 may initiate one or more other operations based on touching one or more masked regions of the input area 152. For example, the touch control board 310 may initiate one or more of an audio notification or a graphical notification.

In some examples, the touch control board 310 may be configured to classify input as touch input or palm input. For example, the touch control board 310 may be configured to classify input as touch input or palm input based on one or more of a comparison of an area associated with the input with an area threshold, a comparison of a duration associated with the input with a duration threshold, or a comparison of an amount of force associated with the input with a force threshold, such as described with reference to the example of FIG. 3.

Figure 4:
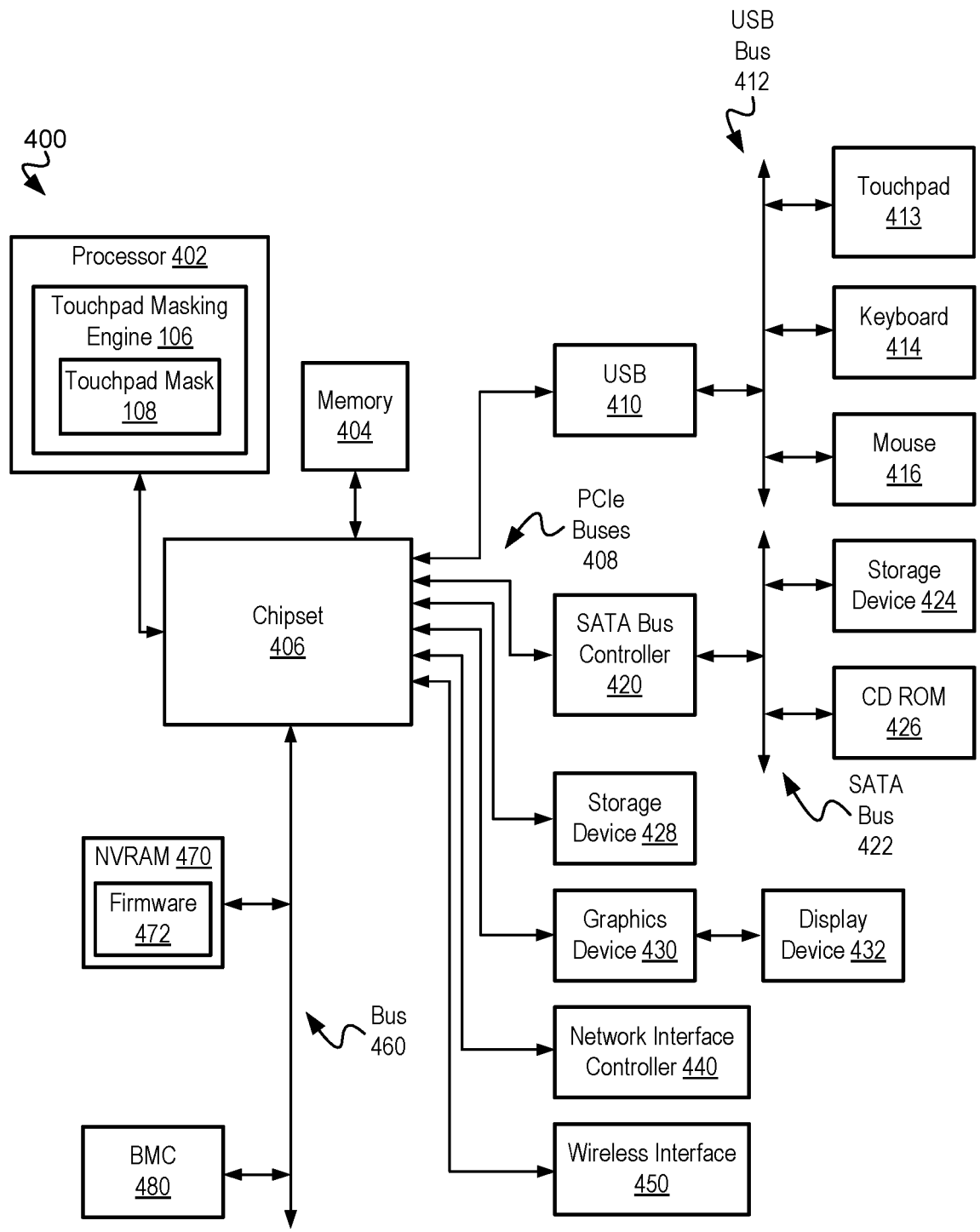
FIG. 4 is a block diagram illustrating an example of an information handling system according to some aspects of the disclosure.

FIG. 4 is a block diagram illustrating an example of an information handling system 400 according to some aspects of the disclosure. In some examples, one or more features of the information handling system 400 may be implemented at the computing device 102, the system 300, or a combination thereof.

Information handling system 400 may include a processor 402 (e.g., a central processing unit (CPU)), a memory 404 (e.g., a dynamic random-access memory (DRAM)), and a chipset 406. In some examples, one or more of the processor 402, the memory 404, or the chipset 406 may be included on a motherboard (also referred to as a mainboard), which may include a printed circuit board (PCB) with embedded conductors organized as transmission lines between any of the processor 402, the memory 404, the chipset 406, or other components of the information handling system 400. The components may be coupled to the motherboard through packaging connections such as a pin grid array (PGA), ball grid array (BGA), land grid array (LGA), surface-mount technology, and/or through-hole technology. In some embodiments, one or more of the processor 402, the memory 404, the chipset 406, or other components may be organized as a system on chip (SoC).

The processor 402 may execute program code by accessing instructions loaded into memory 404 from a storage device, may execute the instructions to operate on data also loaded into memory 404 from a storage device, and may generate output data that is stored to memory 404 or sent to another component. The processor 402 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 402 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 406 may facilitate the transfer of data between the processor 402, the memory 404, and other components. In some embodiments, chipset 406 may include two or more integrated circuits (ICs), such as a northbridge controller coupled to the processor 402, the memory 404, and a southbridge controller, with the southbridge controller coupled to the other components such as universal serial bus (USB) controller 410, a SATA bus controller 420, and PCIe buses 408. The chipset 406 may couple to other components through one or more PCIe buses 408.

Some components may be coupled to one bus line of the PCIe buses 408, whereas some components may be coupled to more than one bus line of the PCIe buses 408. One example component is the USB controller 410, which may interface the chipset 406 to a USB bus 412. The USB bus 412 may couple input/output components, such as one or more of a touchpad 413, a keyboard 414, or a mouse 416, and also other components, such as USB flash drives, or another information handling system. Another example component is the SATA bus controller 420, which may couple the chipset 406 to a SATA bus 422. The SATA bus 422 may facilitate efficient transfer of data between the chipset 406 and components coupled to the chipset 406 and a storage device 424 (e.g., a hard disk drive (HDD) or solid-state disk drive (SDD)) and/or a compact disc read-only memory (CD-ROM) 426. The PCIe buses 408 may also couple the chipset 406 directly to a storage device 428 (e.g., a solid-state disk drive (SDD)). A further example of an example component is a graphics device 430 (e.g., a graphics processing unit (GPU)) for generating output to a display device 432, a network interface controller (NIC) 440, and/or a wireless interface 450 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces). In one example, chipset 406 may be directly connected to an individual end point via a PCIe root port within the chipset and a point-to-point topology as shown in FIG. 4.

The chipset 406 may also be coupled to a bus 460, which may couple the chipset 406 to one or more system management components. For example, a non-volatile random-access memory (NVRAM) 470 storing firmware 472 may be coupled to the bus 460. As another example, a controller, such as a baseboard management controller (BMC) 480, may be coupled to the chipset 406 through the bus 460. BMC 480 may be referred to as a service processor or embedded controller (EC). Capabilities and functions provided by BMC 480 may vary based on the type of information handling system. For example, the term baseboard management system may be used to describe an embedded processor included at a server, while an embedded controller may be found in a consumer-level device. As disclosed herein, BMC 480 may represent a processing device different from processor 402, which provides various management functions for information handling system 400. For example, an embedded controller may be responsible for power management, cooling management, and the like. An embedded controller included at a data storage system may be referred to as a storage enclosure processor or a chassis processor.

Information handling system 400 may include additional processors that are configured to provide localized or specific control functions, such as a battery management controller. Bus 460 can include one or more buses, such as a Serial Peripheral Interface (SPI) bus, an Inter-Integrated Circuit (I2C) bus, a system management bus (SMBUS), a power management bus (PMBUS), or the like. BMC 480 may be configured to provide out-of-band access to devices at information handling system 400. Out-of-band access in the context of the bus 460 may refer to operations performed prior to execution of firmware 472 by processor 402 to initialize operation of the information handling system 400.

Firmware 472 may include instructions executable by processor 402 to initialize and test the hardware components of information handling system 400. For example, the instructions may cause the processor 402 to execute a power-on self-test (POST). The instructions may further cause the processor 402 to load a boot loader or an operating system (OS) from a mass storage device. Firmware 472 additionally may provide an abstraction layer for the hardware, such as a consistent way for application programs and operating systems to interact with the keyboard, display, and other input/output devices. When power is first applied to information handling system 400, the system may begin a sequence of initialization procedures, such as a boot procedure or a secure boot procedure. During the initialization sequence, also referred to as a boot sequence, components of information handling system 400 may be configured and enabled for operation and device drivers may be installed. Device drivers may provide an interface through which other components of information handling system 400 can communicate with a corresponding device. The firmware 472 may include a basic input-output system (BIOS) and/or include a unified extensible firmware interface (UEFI). Firmware 472 may also include one or more firmware modules of the information handling system 400. Additionally, configuration settings for the firmware 472 and firmware of the information handling system 400 may be stored in the NVRAM 470. NVRAM 470 may, for example, be a non-volatile firmware memory of the information handling system 400 and may store a firmware memory map namespace of the information handling system. NVRAM 470 may further store one or more container-specific firmware memory map namespaces for one or more containers concurrently executed by the information handling system.

Information handling system 400 may include additional components and additional buses, not shown for clarity. For example, information handling system 400 may include multiple processor cores (either within processor 402 or separately coupled to the chipset 406 or through the PCIe buses 408), audio devices (such as may be coupled to the chipset 406 through one of the PCIe buses 408), or the like. While a particular arrangement of bus technologies and interconnections is illustrated for the purpose of example, one of skill will appreciate that the techniques disclosed herein are applicable to other system architectures. Information handling system 400 may include multiple processors and/or redundant bus controllers. In some examples, one or more components may be integrated together in an integrated circuit (IC), which may include circuitry built on a common substrate. For example, portions of chipset 406 can be integrated within processor 402. Additional components of information handling system 400 may include one or more storage devices that may store machine-executable code, one or more communications ports for communicating with external devices, and various input and output (I/O) devices, such as a keyboard, a mouse, and a video display.

In some embodiments, processor 402 may include multiple processors, such as multiple processing cores for parallel processing by the information handling system 400. For example, the information handling system 400 may include a server comprising multiple processors for parallel processing. In some embodiments, the information handling system 400 may support virtual machine (VM) operation, with multiple virtualized instances of one or more operating systems executed in parallel by the information handling system 400. For example, resources, such as processors or processing cores of the information handling system may be assigned to multiple containerized instances of one or more operating systems of the information handling system 400 executed in parallel. A container may, for example, be a virtual machine executed by the information handling system 400 for execution of an instance of an operating system by the information handling system 400. Thus, for example, multiple users may remotely connect to the information handling system 400, such as in a cloud computing configuration, to utilize resources of the information handling system 400, such as memory, processors, and other hardware, firmware, and software capabilities of the information handling system 400. Parallel execution of multiple containers by the information handling system 400 may allow the information handling system 400 to execute tasks for multiple users in parallel secure virtual environments.

In some examples, the information handling system 400 may include or correspond to the computing device 102 of FIGS. 1 and 2. For example, the processor 402 may correspond to the one or more processors 104, and the memory 404 may correspond to the memory 120. As additional examples, the touchpad 413 may correspond to the touchpad 150, and the keyboard 414 may correspond to the keyboard 170. In some examples, the touchpad 413 and the keyboard 414 may be coupled to the USB bus 412. The processor 402 may include or execute the touchpad masking engine 106, which may be associated with the touchpad mask 108.

Alternatively or in addition the information handling system 400 may include or may implement one or more features of the system 300 of FIG. 3. For example, in some implementations, the chipset 406 or another component of the information handling system 400 may include one or more of the touch control board 310 or the haptic control board 320. As another example, the processor 402, the BMC 480, or another component of the information handling system 400 may include the host/EC 302.

Figure 5:
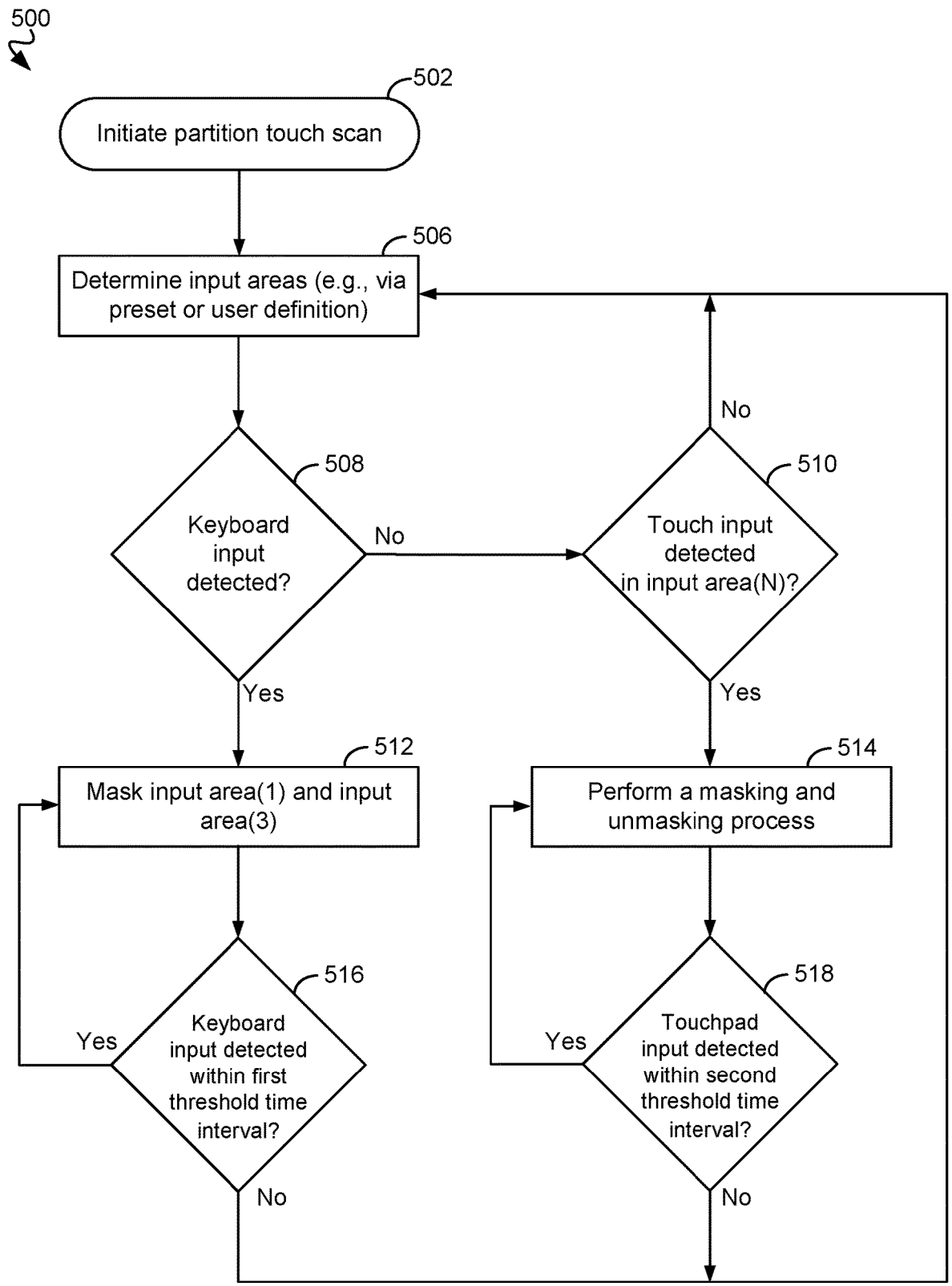
FIG. 5 is a flowchart of an example of a method according to some aspects of the disclosure.

FIG. 5 is a flow chart illustrating an example of a method 500 according to some aspects of the disclosure. In some examples, the method 500 may be performed by the computing device 102, by the system 300, by the information handling system 400, or by another device.

The method 500 may include initiating a partition touch scan associated with a touchpad, at 502. The method 500 may further include determining a plurality input areas of an input area of the touchpad, at 506. For example, the computing device 102 may determine the input areas 152a, 152b, and 152c of the input area 152, such as based on user definition (e.g., via the user configuration input 116) or via a preset (which may be specified by the program or operating system 118).

The method 500 may further include determining whether keyboard input is detected, at 508. For example, the one or more processors 104 may query the keyboard 170 to determine whether the user input 130 is received from the keyboard 170.

If keyboard input is detected, at 508, the method 500 may further include masking input area(1) and input area(3) of the touchpad, at 512. For example, the input area 152a may be associated with an index value of "1," the input area 152b may be associated with an index value of "2," and the input area 152c may be associated with an index value of "3." In such examples, input area(1) may correspond to the input area 152a, and input area(3) may correspond to the input area 152c.

The method 500 may further include determining whether keyboard input is detected within a first threshold time interval, at 516. For example, the computing device 102 may determine whether any input is received from the keyboard 170 within the first threshold time interval. The first threshold time interval may correspond to the threshold time interval 114 or another threshold time interval. In some examples, if no keyboard input is detected within the first threshold time interval, the method 500 may continue, at 506. In some other examples, if keyboard input is detected within the first threshold time interval, the method 500 may continue, at 512 (e.g., by continuing to mask input area(1) and input area(2) and by resetting counting of the first threshold time interval).

If no keyboard input is detected, at 508, the method 500 may further include determining whether touch input is detected in area(N) of the touchpad, at 510. For example, the one or more processors 104 may query the touchpad 150 to determine whether the user input 130 is received from a particular segment of the input area 152. In some examples, the input area 152a may be associated with an index value of "1," the input area 152b may be associated with an index value of "2," the input area 152c may be associated with an index value of "3," and N=1, 2, or 3.

If touch input is detected in area(N) of the touchpad, at 510, the method 500 may further include performing a masking and unmasking process, at 514. An example of a masking and unmasking process is described further with reference to FIG. 6. In some other examples, if no touch input is detected in area(N) of the touchpad, at 510, the method 500 may continue, at 506.

After performing the masking and unmasking process, at 514, the method 500 may further include determining whether touchpad input is detected within a second threshold time interval, at 518. For example, the computing device 102 may determine whether any input is received from the touchpad 150 within the second threshold time interval. The second threshold time interval may correspond to the threshold time interval 114 or another threshold time interval. In some examples, if no touchpad input is detected within the second threshold time interval, the method 500 may continue, at 506. In some other examples, if touchpad input is detected within the second threshold time interval, the method 500 may continue, at 514 (e.g., by continuing to mask one or more input areas based on the masking and unmasking process and by resetting counting of the second threshold time interval).

Figure 6:
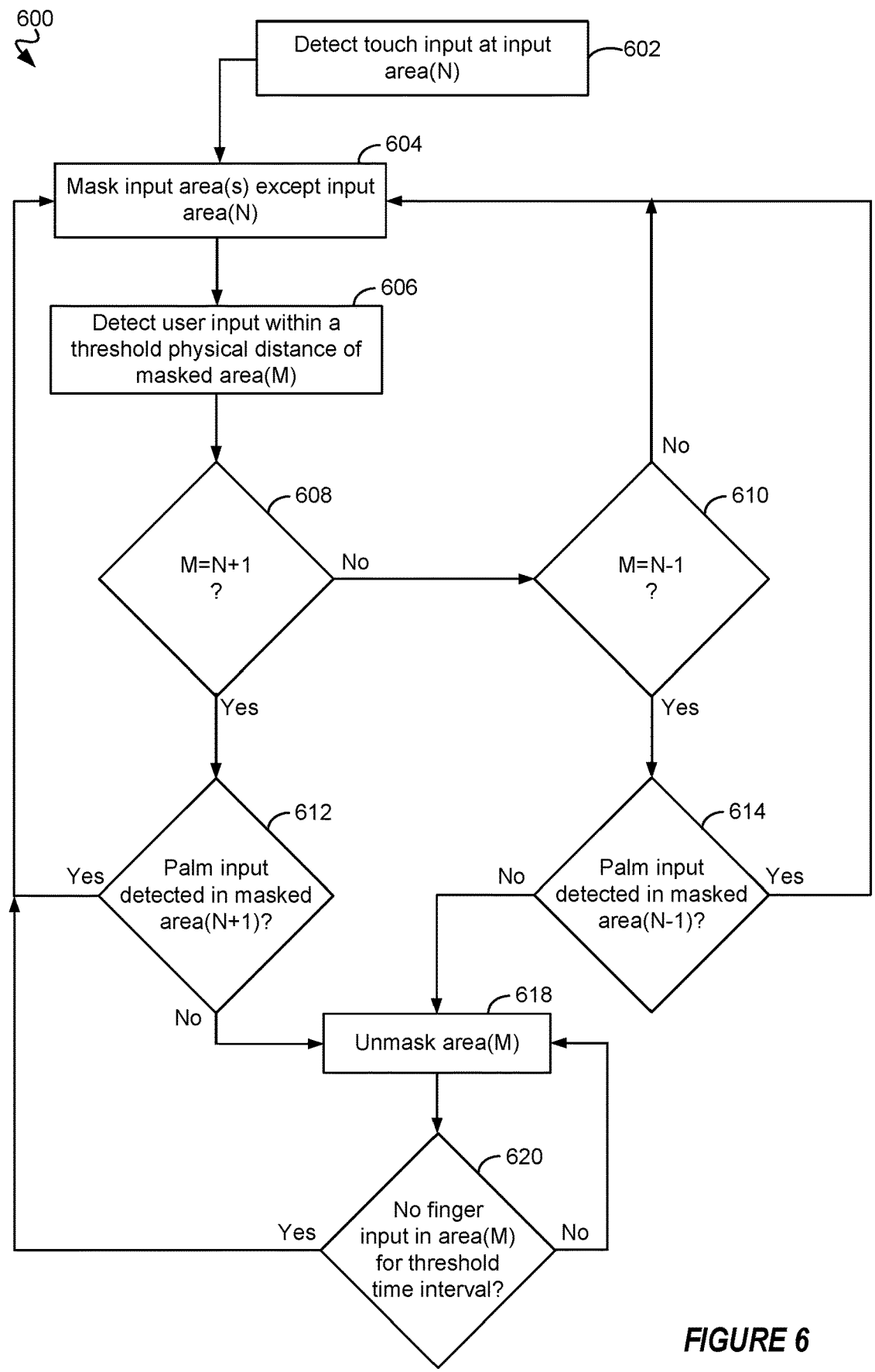
FIG. 6 is a flowchart of another example of a method according to some aspects of the disclosure.

FIG. 6 is a flow chart illustrating an example of a method 600 according to some aspects of the disclosure. In some examples, the method 600 may be performed by the computing device 102, by the system 300, by the information handling system 400, or by another device.

The method 600 may include detecting touch input an input area(N) of a touchpad, at 602. For example, the computing device 102 may detect the user input 130 from one of the input areas 152a, 152b, and 152c. In some examples, the input area 152a may be associated with an index value of "1," the input area 152b may be associated with an index value of "2," the input area 152c may be associated with an index value of "3," and N=1, 2, or 3.

The method 600 may further include masking one or more input areas of the touchpad except for input area(N), at 604. For example, if N=1, then the computing device 102 may mask the input area 152b and the input area 152c. As another example, if N=2, then the computing device 102 may mask the input area 152a and the input area 152c. As an additional example, if N=3, then the computing device 102 may mask the input area 152a and the input area 152b.

The method 600 may further include detecting user input within a threshold physical distance of a masked input area(M). To illustrate, if N=1, then M=2 or 3. As additional examples, if N=2, then M=1 or 3, and if N=3, then M=1 or 2. The threshold physical distance may correspond to the threshold physical distance 112.

The method 600 may further include determining whether M=N+1, at 608. To illustrate, if N=1, and if M=2, then M=N+1. As another example, if N=1, and if M=3, then M N+1.

If M=N+1, the method 600 may further include determining whether palm input is detected in masked area (M=N+1), at 612. If palm input is detected in masked area(M=N+1), the method 600 may continue, at 604. In some other examples, if no palm input is detected in masked area(N+1), the method 600 may further including unmasking area(M), at 618, and may further include determining whether finger input is received in area(M) for a threshold time interval, at 620. The threshold time interval may correspond to the threshold time interval 114 or another threshold time interval. If no finger input in area(M) is received during the threshold time interval, then the method 600 may continue, at 604. In some other examples, if finger input in area(M) is received during the threshold time interval, then the method 600 may continue, at 618.

If M≠N+1, the method 600 may further include determining whether M=N−1, at 608. To illustrate, if N=2 and if M=1, then M=N−1. As another example, if N=1, and if M=3, then M≠N−1. If M≠N−1, the method 600 may continue, at 604.

If M=N−1, the method 600 may further include determining whether palm input is detected in masked area (M=N−1), at 614. If palm input is detected in masked area(M=N−1), the method 600 may continue, at 604. In some other examples, if no palm input is detected in masked area(N−1), the method 600 may further including unmasking area(M), at 618, and may further include determining whether finger input is received in area(M) for a threshold time interval, at 620. The threshold time interval may correspond to the threshold time interval 114 or another threshold time interval. If no finger input in area(M) is received during the threshold time interval, then the method 600 may continue, at 604. In some other examples, if finger input in area(M) is received during the threshold time interval, then the method 600 may continue, at 618.

One or more operations described with reference to the method 600 of FIG. 6 may be included in or may correspond to one or more operations described with reference to the method 500 of FIG. 5. To illustrate, in some aspects, operation 602 of FIG. 6 may correspond to operation 510 of FIG. 5. Further, one or more of operations 604, 606, 608, 610, 612, 614, 618, and 620 of FIG. 6 may be included in operation 514 of FIG. 5.

Figure 7:
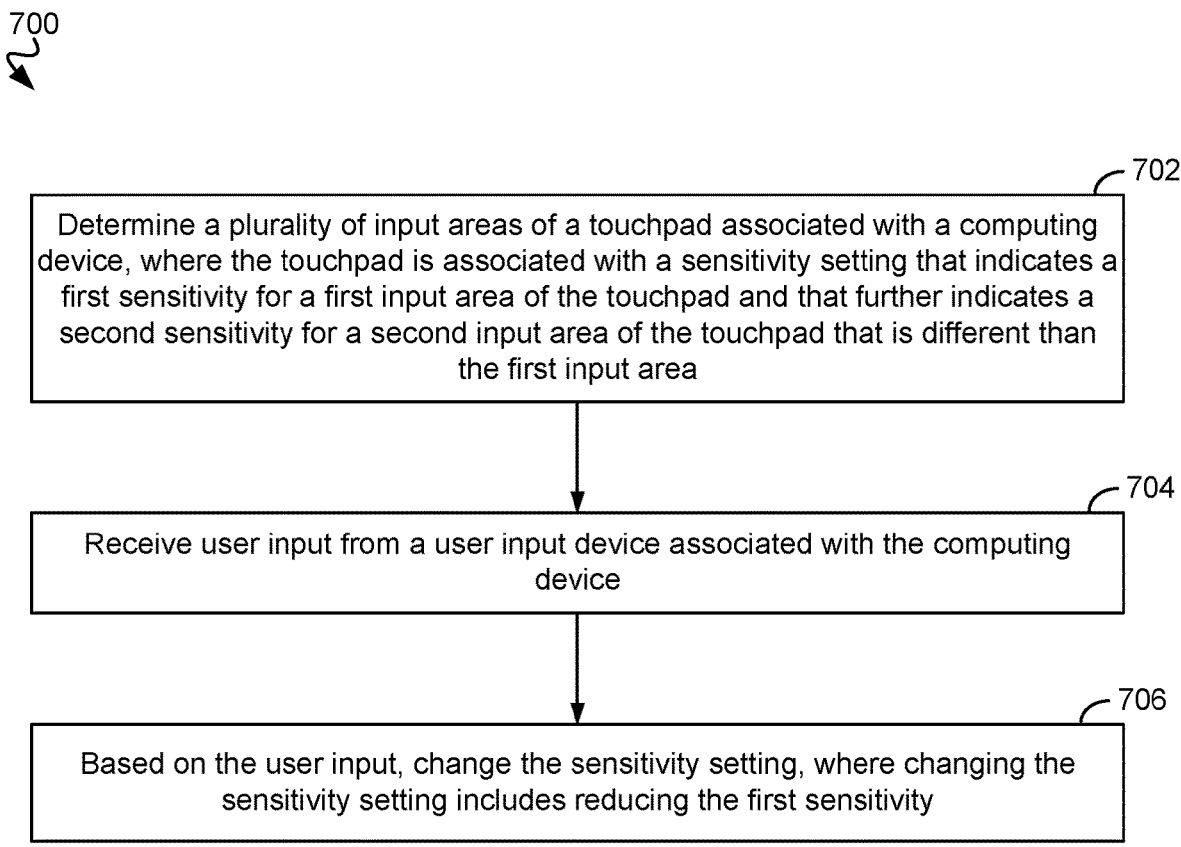
FIG. 7 is a flowchart of another example of a method according to some aspects of the disclosure.

FIG. 7 is a flow chart illustrating an example of a method 700 according to some aspects of the disclosure. In some examples, the method 700 may be performed by the computing device 102, by the system 300, by the information handling system 400, or by another device.

The method 700 includes determining a plurality of input areas of a touchpad associated with a computing device, at 702. The touchpad is associated with a sensitivity setting that indicates a first sensitivity for a first input area of the touchpad and that further indicates a second sensitivity for a second input area of the touchpad that is different than the first input area. For example, the computing device 102 may determine the input areas 152a, 152b, and 152c of the touchpad 150. The touchpad 150 may be associated with the sensitivity setting 110.

The method 700 may further includes receiving user input from a user input device associated with the computing device, at 704. For example, the computing device 102 may receive the user input 130 (e.g., from the touchpad 150 or from the keyboard 170).

The method 700 further includes, based on the user input, changing the sensitivity setting, where changing the sensitivity setting includes reducing the first sensitivity, at 706. For example, the computing device 102 may change the sensitivity setting 110 based on the touchpad mask 108. In some examples, the first input area corresponds to one of the input areas 152a, 152b, and 152c. In some examples, changing the sensitivity setting includes reducing the first sensitivity independently of the second sensitivity of the second input area. In some examples, the second input area corresponds to another of the input areas 152a, 152b, and 152c.

In some implementations of the method 700, the plurality of input areas further include a third input area different than the first input area and the second input area, the sensitivity setting further indicates a third sensitivity for the third input area, and the touchpad mask further indicates a change to the third sensitivity. To illustrate, the second input area may be one of: adjacent to and positioned between the first input area and the third input area (e.g., where the second input area corresponds to the input area 152b); positioned left of both the first input area and the third input area(e.g., where the second input area corresponds to the input area 152a); or positioned right of both the first input area and the third input area (e.g., where the second input area corresponds to the input area 152c).

Although certain examples have been described with reference to physical input (e.g., via a user fingertip or via a stylus), those of skill in the art will recognize that other examples are also within the scope of the disclosure. For example, alternatively or in addition to one or more of stylus-based input or finger-based input, a user input device (such as the touchpad 150) may detect gesture input (e.g., without physical touching of the touchpad 150). To illustrate, the touchpad 150 may include one or more sensor arrays that generate an electromagnetic signal (e.g., an infrared signal) or an acoustic signal and that detect reflection of the electromagnetic or acoustic signal to receive gesture input, such as positioning and orientation of the face or fingers of a user. In some examples, the gesture input is included in or corresponds to the user input 130 (e.g., alternatively or in addition to user input from a user fingertip or from a stylus).

One or more aspects described herein may enhance operation of an information handling system, such as the computing device 102 or the information handling system 400. For example, by decreasing the sensitivity of an inactive area of the touchpad 150, unintended operation that may result from a "ghost touch" of the inactive area may be reduced or avoided. By reducing or avoiding such unintended operations, user experience may be enhanced while also potentially reducing unintended usage of processing resources associated with the information handling system, such as by avoiding unintentionally causing the information handling system to retrieve a program from a main memory, to load the program or file to a random access memory, and to begin executing the program using a processor the information handling system. Accordingly, user experience and device performance may be enhanced.

A diagram described herein may be generally set forth as a logical flowchart diagram. As such, the depicted order and labeled steps may be indicative of aspects of the disclosed method. Other steps and methods may also be used to implement one or more steps, or portions thereof, of the illustrated method. Additionally, the format and symbols employed are provided to explain the logical steps of the method and are understood not to limit the scope of the method. Although various arrow types and line types may be employed in the flowchart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

One or more operations described herein may be described as being performed by a controller or processor. Such operations may be performed by any circuit configured to perform the operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software and/or firmware.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

Although the present disclosure and certain representative advantages have been described in detail, it should be understood that various changes, substitutions and alterations can be made herein without departing from the scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus comprising:
    a memory; and
    one or more processors coupled to the memory, wherein the one or more processors are configured to:
        determine a plurality of input areas of a touchpad associated with a computing device, wherein the touchpad is associated with a sensitivity setting that indicates a first sensitivity for a first input area of the touchpad and that further indicates a second sensitivity for a second input area of the touchpad that is different than the first input area;
        receive first user input from a user input device associated with the computing device;
        based on the first user input, change the sensitivity setting, wherein changing the sensitivity setting includes reducing the first sensitivity; and
        based on second user input associated with a portion of the second input area that is within a threshold physical distance of the first input area, increase the first sensitivity.

2. The apparatus of claim 1, wherein the plurality of input areas further include a third input area different than the first input area and the second input area, and wherein the sensitivity setting further indicates a third sensitivity for the third input area.

3. The apparatus of claim 2, wherein the second input area is one of: adjacent to and positioned between the first input area and the third input area; positioned left of both the first input area and the third input area; or positioned right of both the first input area and the third input area.

4. The apparatus of claim 1, wherein the one or more processors are further configured to dynamically modify one or more of a first size of the first input area, a second size of the second input area, or a quantity of the plurality of input areas.

5. The apparatus of claim 4, wherein the one or more processors are further configured to dynamically modify one or more of a first size of the first input area, a second size of the second input area, or a quantity of the plurality of input areas.

6. The apparatus of claim 4, wherein the one or more processors are further configured to receive user configuration input indicating configuration of the first size, the second size, or the quantity of the plurality of input areas.

7. The apparatus of claim 4, wherein the one or more processors are further configured to execute a program or operating system that specifies one or more of the first size, the second size, or the quantity of the plurality of input areas.

8. The apparatus of claim 1, wherein the one or more processors are further configured to:
    detect expiration of a threshold time interval since performing the change of the sensitivity setting during which no additional user input is received via the user input device; and
    based on the expiration of the threshold time interval, adjust the sensitivity setting.

9. The apparatus of claim 1, wherein the user input device corresponds to a keyboard, and wherein the first user input is received via one or more keys of the keyboard.

10. The apparatus of claim 1, wherein the user input device corresponds to the touchpad.

11. The apparatus of claim 10, wherein the one or more processors are further configured to:
    after performing the change of the sensitivity setting, monitor at least the portion of the second input area for the second user input.

12. The apparatus of claim 1, further comprising a display device, wherein the touchpad has a same width as, and extends edge-to-edge with, the display device.

13. The apparatus of claim 1, wherein the memory is configured to store a touchpad mask associated with the touchpad, and wherein the one or more processors are further configured to change the sensitivity setting based on the touchpad mask.

14. A method comprising:
    determining a plurality of input areas of a touchpad associated with a computing device, wherein the touchpad is associated with a sensitivity setting that indicates a first sensitivity for a first input area of the touchpad and that further indicates a second sensitivity for a second input area of the touchpad that is different than the first input area;
    receiving first user input from a user input device associated with the computing device;
    based on the first user input, changing the sensitivity setting, wherein changing the sensitivity setting includes reducing the first sensitivity; and based on second user input associated with a portion of the second input area that is within a threshold physical distance of the first input area, increasing the first sensitivity.

15. The method of claim 14, wherein changing the sensitivity setting further includes increasing or maintaining the second sensitivity.

16. The method of claim 14, wherein the first sensitivity is changed independently of the second sensitivity.

17. An information handling system comprising:
a touchpad;
a keyboard;
a memory; and
one or more processors coupled to the memory, wherein the one or more processors are configured to:
determine a plurality of input areas of the touchpad, wherein the touchpad is associated with a sensitivity setting that indicates a first sensitivity for a first input area of the touchpad and that further indicates a second sensitivity for a second input area of the touchpad that is different than the first input area;
receive first user input from a user input device, wherein the user input device corresponds to one of the touchpad or the keyboard;
based on the first user input, change the sensitivity setting, wherein changing the sensitivity setting includes reducing the first sensitivity; and
based on second user input associated with a portion of the second input area that is within a threshold physical distance of the first input area, increase the first sensitivity.

18. The information handling system of claim 17, wherein the one or more processors are further configured to change the sensitivity setting further by increasing the second sensitivity.

19. The information handling system of claim 17, wherein the one or more processors are further configured to maintain the second sensitivity while changing the sensitivity setting.

20. The information handling system of claim 17, further comprising a display device, wherein the touchpad has a same width as, and extends edge-to-edge with, the display device.

* * * * *